(No Model.)
J. W. BUNKER.
Nut Lock.
No. 238,340.　　　　　　Patented March 1, 1881.
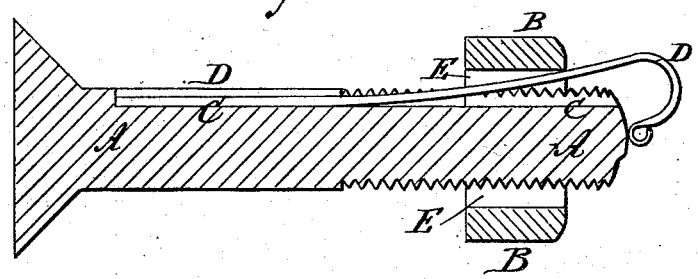
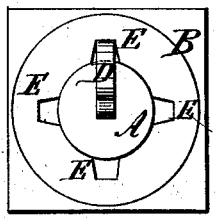
WITNESSES:　　　　　　INVENTOR:

UNITED STATES PATENT OFFICE.

JOHN W. BUNKER, OF PALMER, TEXAS.

NUT-LOCK.

SPECIFICATION forming part of Letters Patent No. 238,340, dated March 1, 1881.

Application filed April 20, 1880. (No model.)

*To all whom it may concern:*

Be it known that I, JOHN W. BUNKER, of Palmer, in the county of Ellis and State of Texas, have invented a new and useful Improvement in Nut-Locks, of which the following is a specification.

Figure 1 is a longitudinal section of the improvement. Fig. 2 is an end view of the same.

Similar letters of reference indicate corresponding parts.

The object of this invention is to furnish nut-locks so constructed as to prevent the nuts from working loose or off bolts exposed to an intermittent or constant jarring, and which will allow the nuts to be screwed on and off, as required.

A represents a bolt, and B a nut. In one side of the bolt A is formed a groove, C, extending across the screw-threads and into the plain part of the body of the bolt to receive the spring D. The part of the groove C that extends into the plain body of the bolt A may be dovetailed to receive the dovetailed shank of the spring D; or the shank of the spring D may be secured in the said groove by solder or in any other convenient manner. The spring D is so formed as to stand out from the forward part of the bolt A, and its outer end is bent over into U form, so that its end may rest against the end of the said bolt A, as shown in Fig. 1.

In the inner surface of the nut B, across its screw-threads, are cut four (more or less) grooves, E, to receive the spring D, as shown in Figs. 1 and 2. With construction the nut B cannot be turned on or off while the spring D is in one of the grooves E, and consequently the nut cannot jar or work loose.

By forcing the spring D into the groove C the nut B can be screwed on and off.

A recess is formed in the end of the bolt A to receive the end of the spring D when the said spring is forced into the groove C and hold it in place while the nut is being screwed on and off.

The advantage of locking the end of the spring in a notch of the bolt while the nut is being screwed on or off is that it greatly facilitates the manipulation of the nut, so that the operator or workman will discharge this part of his duty with great rapidity and economy of time.

Having thus described my invention, I claim as new and desire to secure by Letters Patent—

In a nut-lock where the spring is fastened in the groove of the bolt and works in a groove of the nut, the outer extension of the spring D made U-shaped or in the form of a bow whose free end is adapted to be sprung into an end notch diametrically opposite the groove C, as shown and described, whereby the spring is held down in the groove of bolt while the nut is being screwed on or off.

JOHN WILLIAMSON BUNKER.

Witnesses:
E. H. PARKS,
F. L. JEFFERS.